(12) United States Patent
Wolnowski et al.

(10) Patent No.: US 12,131,148 B2
(45) Date of Patent: Oct. 29, 2024

(54) FAILSAFE UPDATE OF BOOTLOADER FIRMWARE

(71) Applicant: Carrier Corporation, Palm Beach Gardens, FL (US)

(72) Inventors: Piotr Wolnowski, Gdańsk (PL); Pawel Raasz, Gdańsk (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 15 days.

(21) Appl. No.: 17/500,244

(22) Filed: Oct. 13, 2021

(65) Prior Publication Data

US 2022/0171614 A1    Jun. 2, 2022

(30) Foreign Application Priority Data

Nov. 30, 2020 (EP) .................................. 20275177.2

(51) Int. Cl.
*G06F 8/654* (2018.01)

(52) U.S. Cl.
CPC .................................... *G06F 8/654* (2018.02)

(58) Field of Classification Search
CPC .................................... G06F 8/654; G06F 8/60
See application file for complete search history.

(56) References Cited

U.S. PATENT DOCUMENTS

| | | | |
|---|---|---|---|
| 5,568,641 A * | 10/1996 | Nelson | G06F 11/1433 |
| | | | 714/E11.135 |
| 7,992,076 B2 | 8/2011 | Raja | |
| 8,448,023 B2 | 5/2013 | James et al. | |
| 8,595,716 B2 | 11/2013 | Keller et al. | |
| 8,799,555 B2 | 8/2014 | Post et al. | |
| 9,336,010 B2 * | 5/2016 | Kochar | G06F 9/4401 |
| 9,703,346 B2 | 7/2017 | Mudusuru et al. | |
| 2002/0188886 A1 | 12/2002 | Liu et al. | |
| 2005/0132179 A1 | 6/2005 | Glaum et al. | |
| 2006/0015683 A1 * | 1/2006 | Ashmore | G06F 11/1441 |
| | | | 711/135 |

(Continued)

FOREIGN PATENT DOCUMENTS

| | | |
|---|---|---|
| CN | 103246536 A | 8/2013 |
| CN | 104090796 A | 10/2014 |

(Continued)

OTHER PUBLICATIONS

European Search Report for Application No. 20275177.2; Issued May 3, 2021; 8 Pages.

(Continued)

*Primary Examiner* — Wei Y Zhen
*Assistant Examiner* — Brahim Bourzik
(74) *Attorney, Agent, or Firm* — CANTOR COLBURN LLP

(57) ABSTRACT

A method of updating firmware stored in a non-volatile memory of a controller is disclosed. The non-volatile memory includes a first set of memory blocks configured to store a bootloader for the controller. The method includes storing a bootloader update application in a second set of memory blocks of the non-volatile memory, and storing a jump code in an initial memory block of the first set of memory blocks, wherein the jump code comprises an instruction to jump to an initial memory block of the second set of memory blocks.

12 Claims, 7 Drawing Sheets

(56) References Cited

U.S. PATENT DOCUMENTS

| | | | |
|---|---|---|---|
| 2010/0131694 A1 | 5/2010 | Kelly et al. | |
| 2010/0268926 A1 | 10/2010 | Zhang | |
| 2014/0265919 A1* | 9/2014 | Pope | G06F 8/654 |
| | | | 315/294 |
| 2014/0351569 A1* | 11/2014 | Durand | G06F 8/654 |
| | | | 713/1 |
| 2017/0255458 A1* | 9/2017 | Son | G06F 8/654 |
| 2017/0277154 A1* | 9/2017 | Carini | G06F 8/41 |
| 2017/0293484 A1* | 10/2017 | Haase | G06F 8/654 |
| 2020/0302061 A1* | 9/2020 | Rizos | G06F 3/0683 |
| 2020/0302062 A1* | 9/2020 | Rizos | G06F 9/4406 |

FOREIGN PATENT DOCUMENTS

| | | |
|---|---|---|
| CN | 105573802 A | 5/2016 |
| CN | 105677388 A | 6/2016 |
| CN | 106843926 A | 6/2017 |
| CN | 109933348 A | 6/2019 |
| CN | 110687840 A | 1/2020 |
| TW | 201115467 A | 5/2011 |
| WO | 2009044416 A1 | 4/2009 |
| WO | 2015088544 A1 | 6/2015 |

OTHER PUBLICATIONS

Vandecappelle, Arnout; "Upgrade without Bricking", Essensium N.V., 2012, 51 Pages. https://elinux.org/images/6/61/Upgrading_Without_Bricking.pdf.

* cited by examiner

FAILSAFE UPDATE OF BOOTLOADER FIRMWARE

FOREIGN PRIORITY

This application claims priority to European Patent Application No. 20275177.2, filed Nov. 30, 2020, and all the benefits accruing therefrom under 35 U.S.C. § 119, the contents of which in its entirety are herein incorporated by reference.

TECHNICAL FIELD

The present disclosure relates to a method of updating firmware of a system such as a fire protection system or an intrusion detection system.

BACKGROUND

Systems such as fire protection systems and intrusion detection systems typically comprise a plurality of devices electrically connected, e.g. in a loop configuration. For example, fire protection systems typically comprise a fire control panel and one or more other fire protection devices, such as fire detectors (such as smoke and heat sensors), manual call points, fire alarms, and fire suppression systems (such as sprinklers, fire barriers, smoke extractors, etc.).

Each device of these systems can include an embedded microcontroller configured to run an application that provides the base functions of that device. The application can be provided as firmware, e.g. where the application code is stored in non-volatile memory (e.g. flash memory) of the microcontroller.

In these systems, a so-called bootloader may also be provided as firmware, e.g. where bootloader code is also stored in the non-volatile memory. The bootloader is responsible for loading (starting) the application, and also provides the device with the ability to update or replace the application code.

The Applicant believes that there remains scope for improvements to methods of updating firmware.

SUMMARY

The present invention provides a method of updating firmware stored in a non-volatile memory of a controller, wherein the non-volatile memory comprises a first set of memory blocks configured to store a bootloader for the controller, the method comprising: storing a bootloader update application in a second set of memory blocks of the non-volatile memory; and storing a jump code in an initial memory block of the first set of memory blocks, wherein the jump code comprises an instruction to jump to an initial memory block of the second set of memory blocks.

The present invention also provides a system comprising: a controller comprising a non-volatile memory configured to store firmware for the controller, wherein the non-volatile memory comprises a first set of memory blocks configured to store a bootloader for the controller; wherein the system is configured to update the firmware by: storing a bootloader update application in a second set of memory blocks of the non-volatile memory; and storing a jump code in an initial memory block of the first set of memory blocks, wherein the jump code comprises an instruction to jump to an initial memory block of the second set of memory blocks.

Various embodiments are directed to a method of updating firmware stored in a non-volatile memory of a controller such as a microcontroller, and in particular to a method of updating a bootloader firmware for the controller. According to the method, a bootloader update application is stored in the non-volatile memory in a particular (second) set of memory blocks of the non-volatile memory, i.e. where the second set of memory blocks includes an initial memory block, optionally one or more intermediate memory blocks, and a final memory block. The bootloader update application is an application that is operable to update (e.g. replace) an existing bootloader stored in a first set of memory blocks of the non-volatile memory, i.e. where the first set of memory blocks includes an initial memory block, optionally one or more intermediate memory blocks, and a final memory block.

The Applicant has recognised that when a bootloader is being updated using conventional techniques, there can be a significant risk of the (micro) controller becoming inoperable (i.e. "bricked"), e.g. if the controller loses power or is otherwise restarted while the bootloader is being updated.

Thus, according to various embodiments, as a step in updating the bootloader (i.e. as a step of the bootloader update application), the initial memory block of first set of memory blocks (i.e. the memory block of the non-volatile memory that stores an initial data block of the bootloader) is replaced (over-written) with a jump code, where the jump code includes an instruction to jump to the initial memory block of the second set of memory blocks (i.e. the memory block of the non-volatile memory that stores an initial data block of the bootloader update application). The jump code may also comprise a minimal startup code (i.e. as required to set the vector table and stack pointer) together with the instruction to jump to the initial memory block of the second set of memory blocks.

In this regard, the Applicant has recognized that when the controller loses (external) power, sufficient energy may be provided internally to the controller (e.g. stored in one or more capacitors of the controller) to allow at least one (or more) memory block of the non-volatile memory (e.g. at least one group (e.g. row) of memory blocks) to be successfully erased and written to. This property effectively guarantees that the jump code will be successfully stored in the initial memory block of the first set of memory blocks, even if the controller loses power.

Furthermore, storing the jump code in the initial memory block of the first set of memory blocks (i.e. replacing the initial data block of the bootloader with a jump code) means that, should the controller lose power or otherwise be restarted while the (other) memory blocks that store the existing bootloader are being updated (replaced), when the controller is restarted, the controller's processing will return to the bootloader update application via the jump code, while bypassing the potentially corrupted or incomplete bootloader code. The bootloader update application can then resume its operation and complete its updating of the bootloader.

It will be appreciated that various embodiments accordingly provide a failsafe (i.e. power loss resistant) method for updating a bootloader firmware.

The controller can be any suitable controller such as an embedded controller of a device such as a fire protection device or an intrusion detection device. The controller may be provided a single integrated circuit (IC) chip, e.g. may be a microcontroller, a system-on-a-chip, etc.

The device may form part of a system such as a fire protection system or an intrusion detection system. The system may comprises a plurality of such devices which may be electrically connected e.g. in a loop configuration.

For example, where the system is a fire protection system, the system may comprise a fire control panel and a plurality of fire protection devices connected to the fire control panel. As such, the controller may be an embedded (micro) controller of a fire protection device such as a fire detector, a smoke detector, a heat detector, a manual call point, a fire alarm, a fire suppression device, a sprinkler, a fire barrier, a smoke extractor, and the like. Where the system is an intrusion detection system, the system may comprise an intrusion detection control panel and a plurality of intrusion detection devices connected to the intrusion detection control panel. As such, the controller may be an embedded (micro) controller of an intrusion detection device such as a motion sensor, contact sensor, and the like.

The controller (e.g. microcontroller) may comprise a processor core together with one or more input/output stages. The controller may optionally include random access memory (RAM) accessible to the processor core.

The controller (e.g. microcontroller) includes non-volatile memory. The non-volatile memory may comprise any suitable non-volatile memory such as flash memory. The non-volatile memory may comprise a plurality of memory cells arranged into a plurality of memory blocks (otherwise known as memory "pages"), i.e. where each memory block (page) includes a (different, non-overlapping) sub-set of the memory cells. Each memory block may be configured to store a block of data (a data block). The non-volatile memory may be configured such that each memory block can be written to independently of each other memory block. A memory block (page) is accordingly the smallest collection of memory cells that can be written to in a single (write) operation. The non-volatile memory may comprise any suitable (plural) number of memory blocks.

The non-volatile memory may be configured such that each memory block can be erased independently of each other memory block. However, more typically, the non-volatile memory may be configured such that each group of plural (e.g. 4) memory blocks (such as each row of memory blocks) can be erased independently of each other group (e.g. row) of memory blocks.

Each memory block may have a respective address. Thus, a sequence of memory addresses may be provided and defined for the non-volatile memory, where each memory address of the sequence corresponds to (refers to) an individual one of the plurality of memory blocks. The memory addresses may comprise virtual addresses or physical addresses.

The non-volatile memory may be configured to store (and may store) firmware of the controller, e.g. in the form of suitable (e.g. machine readable or other low level) code.

The firmware may in general include one or more applications, together with a bootloader. Thus, the non-volatile memory may be configured to store (and may store) one or more applications and a bootloader, e.g. in the form of application code and bootloader code.

The one or more applications may comprise any suitable application or applications, such as an application configured to provide the base functions of the device.

The bootloader may comprise any suitable bootloader, but in particular embodiments the bootloader is a single-stage bootloader. It would also be possible for the bootloader to be the first (earliest) stage in a multi-stage bootloader. The bootloader may be configured to load (to start) the application, and may also be configured such that the application (code) can be updated or replaced.

The controller may be configured such that a first set of memory blocks (of the plurality of memory blocks) are configured to store the bootloader (e.g. such that a first set of memory blocks is assigned for storing the bootloader). The first set of memory blocks may include an initial memory block, optionally one or more intermediate memory blocks, and a final memory block. The first set of memory blocks may be a contiguous set of memory blocks (physically and/or logically), but this need not be the case.

The first set of memory blocks may have (may be addressed by) a first set of memory addresses. The first set of memory addresses may include an initial memory address, optionally one or more intermediate memory addresses, and a final memory address. The first set of memory addresses may be a contiguous set of memory addresses. The first set of memory addresses may be the earliest memory addresses in the sequence of memory addresses for the non-volatile memory, but this need not be the case.

The controller may be configured such that memory blocks of the plurality of memory blocks other than the first set (i.e. memory blocks with addresses other than the first set of addresses) are configured to store the one or more applications.

The controller may be configured such that, upon start-up (power on), the bootloader is initially executed. This may be achieved in any suitable manner. In various particular embodiments, the controller is configured, upon start-up (power on), to execute the code stored in the first set of memory blocks, i.e. by initially executing the code stored in the initial memory block of the first set of memory blocks. For example, where the initial memory block of the first set of memory blocks is the memory block of the non-volatile memory that has the earliest (first) memory address in the sequence of memory addresses for the non-volatile memory, the controller may be configured, upon start-up (power on), to execute the code stored in the memory block having the earliest (first) memory address in the sequence of memory addresses for the non-volatile memory.

The controller may also be configured, after executing the code stored in a particular block, to then execute the code stored in the next memory block (i.e. the memory block that has the next memory address in the sequence of memory addresses for the non-volatile memory), and so on (except where the executed code includes a jump instruction, as will be described further below). In this way, where desired, the controller may execute the (entire) bootloader which may be stored across the first set of (plural) memory blocks upon start-up (power on).

The bootloader may be configured to determine whether it is desired to update (e.g. replace) the application (code), e.g. by checking a (external) signal (e.g. which may be sent to the controller from the control panel) and/or checking the status of a flag in the non-volatile memory, or otherwise. When it is determined that this is not (is other than) needed, the application may then be loaded (started), e.g. by executing the appropriate application code stored in the non-volatile memory.

When, however, it is determined that it is desired to update (e.g. replace) the application (code), the application (code) may then be updated (replaced) (instead of loading the application), e.g. by writing new blocks of application code to the non-volatile memory.

As described above, the Applicant has recognized that, in addition to updating the application, it may be necessary to update the bootloader, but that in conventional techniques for updating a bootloader, there can be a significant risk of the controller becoming inoperable (i.e. "bricked"), e.g. if the controller loses power or is otherwise restarted while the bootloader is being updated or replaced (particularly where the bootloader to be updated is a single stage bootloader or a first stage of a multi-stage bootloader).

Thus, embodiments provide a bootloader update application which may be operable to update (replace) an existing bootloader stored in the non-volatile memory with a new bootloader. The bootloader update application may be configured to update the bootloader in a failsafe (i.e. power loss resistant) manner.

The bootloader update application may be initially provided to the controller and stored in the non-volatile memory. This may be done using the above-described process of updating the application.

Thus, the (existing) bootloader may be executed, and an external signal and/or a flag may set so that the bootloader determines that the application should be updated. The application may then be updated (e.g. at least partially replaced) by writing new blocks of code for the bootloader update application to the non-volatile memory (at least partially in place of the existing application code).

The bootloader update application (code) is stored in a second set of memory blocks of the non-volatile memory. The second set of memory blocks may comprise a different (non-overlapping) set of memory blocks to the first set of memory blocks. The second set of memory blocks may include an initial memory block, optionally one or more intermediate memory blocks, and a final memory block. The second set of memory blocks may be a contiguous set of memory blocks (physically and/or logically), but this need not be the case.

The second set of memory blocks may have (may be addressed by) a second set of memory addresses. The second set of memory addresses may include an initial memory address, optionally one or more intermediate memory addresses, and a final memory address. The second set of memory addresses may be a contiguous set of memory addresses.

The bootloader update application (code) that is stored in the second set of memory blocks may comprise a plurality of data blocks. As well as the bootloader update application (code), the jump code may be stored in the second set of memory blocks.

In addition, the new bootloader code itself (or parts of the bootloader code that are to be replaced) may be stored in the second set of memory blocks. Alternatively, an instruction or instructions that will cause the controller to download the new bootloader code (or parts of the bootloader code that are to be replaced) e.g. from an external device such as the control panel and/or via a network connection, may be stored in the second set of memory blocks. The new bootloader code will comprise a plurality of data blocks, including an initial data block, optionally one or more intermediate data blocks, and a final data block.

Once the bootloader update application (and the jump code and optionally the new bootloader) has been stored in the second set of memory blocks, the controller may then run (execute) the bootloader update application, e.g. by executing the appropriate application code stored in the second set of memory blocks.

In various embodiments, the bootloader update application is configured to store the jump code in the initial memory block of the first set of memory blocks. The jump code may be stored in only the (single, very first) initial memory block of the first set of memory blocks, or the jump code may be stored in a set of plural memory blocks of the first set of memory blocks that includes the (single, very first) initial memory block of the first set of memory blocks.

For example, the jump code may be stored in the initial group (e.g. row) of memory blocks of the first set of memory blocks.

Thus, the controller, when executing the bootloader update application, will store the jump code in (at least) the initial memory block of the first set of memory blocks. This may comprise the controller copying the jump code that was stored in the second set of memory blocks (as described above) to (at least) the initial memory block of the first set of memory blocks. Copying the jump code to the initial memory block may comprise erasing (at least) the initial memory block (e.g. erasing the initial group (e.g. row) of memory blocks that includes the initial memory block), and writing the jump code to (at least) the initial memory block (e.g. writing the jump code to the initial group (e.g. row) of memory blocks).

The jump code may comprise a minimal startup code (i.e. as required to set the vector table and stack pointer) and an instruction to jump (branch) to the initial (first) memory block (i.e. to the initial (first) memory address) of the second set of memory blocks (i.e. to the memory block at which the first data block of the bootloader update application code is stored). This means that, when executed by the controller, the jump code will cause the controller to branch to the bootloader update application that is stored in the second set of memory blocks.

Thus, as a step in updating the bootloader (i.e. as a step of the bootloader update application), the initial memory block of the first set of memory blocks (i.e. the memory block of the non-volatile memory that stores the initial (first) data block of the bootloader) is replaced (over-written) with a jump code, where the jump code includes an instruction to jump to the initial memory block of the second set of memory blocks (i.e. the memory block of the non-volatile memory that stores the initial (first) data block of the bootloader update application).

In this regard, the Applicant has recognized that when the controller loses (external) power, sufficient energy may be provided internally to the controller (e.g. stored in one or more capacitors of the controller or otherwise) to allow at least one (or more) memory block of the non-volatile memory (such as at least one (or more) group (row) of memory blocks) to be successfully erased and written to. This property effectively guarantees that the jump code will be successfully stored in the initial memory block of the first set of memory blocks, even if the controller loses power.

Furthermore, storing the jump code in the initial memory block of the first set of memory blocks (i.e. replacing the initial data block of the bootloader with a jump code) means that, should the controller lose power or otherwise be restarted while the (other) memory blocks that store the existing bootloader are being updated, when the controller is restarted, the controller's processing will return to the bootloader update application via the jump code, while bypassing the potentially corrupted or incomplete bootloader code. The bootloader update application can then resume its operation and complete its updating of the bootloader.

It will be understood that various embodiments accordingly provide a failsafe (i.e. power-loss resistant) method for updating a bootloader firmware.

In embodiments, the controller may be configured such that one memory block, or more than one memory block of the non-volatile memory can be reprogrammed (erased and written) without the controller receiving external power. For example, the controller may be configured such that two, four, six, eight, ten or more memory blocks of the non-volatile memory can be reprogrammed (erased and written)

without the controller receiving external power. The controller may be configured such that one group (row) of memory blocks, or more than one group (row) of memory blocks can be reprogrammed (erased and written) without the controller receiving external power. For example, the controller may be configured such that two, four, six, eight, ten or more groups (rows) of memory blocks can be reprogrammed (erased and written) without the controller receiving external power. Configuring the controller such that more than one memory block of the non-volatile memory can be programmed (erased and written) without the controller receiving external power beneficially provides a degree of redundancy.

In embodiments, before storing the jump code in the initial memory block of the first set of memory blocks, the controller may (and the bootloader update application may be configured to) determine whether the controller is currently receiving (external) power. When it is determined that the controller is currently receiving (external) power, then the controller may (and the bootloader update application may be configured to) proceed with the step of storing the jump code in the initial memory block of the first set of memory blocks. When it is determined that the controller is not (is other than) receiving (external) power, then the controller may (and the bootloader update application may be configured to) not (other than) proceed with this step, e.g. by cancelling the bootloader update process or pausing the bootloader update process (in particular pausing the storing of the jump code in the initial memory block of the first set of memory blocks) until it is determined that power is present. This ensures that the controller will have sufficient power to successfully store the jump code.

Once the jump code has been stored in the (one or more) initial memory block(s) of the first set of memory blocks, the controller may (and the bootloader update application may be configured to) then store data blocks of the new bootloader other than the (one or more) initial data block(s) (i.e. the intermediate and final data blocks, not including the (one or more) initial data block(s)) in memory blocks of the first set of memory blocks other than the initial memory block(s) (i.e. the intermediate and final memory blocks, not including the initial memory block(s)). In other words, the controller may store the data blocks of the new bootloader except the initial (first) data block(s) in memory blocks of the first set of memory blocks except the initial (first) memory block(s) of the first set of memory blocks (in which the jump code is stored).

It will be understood that, should the controller lose power or otherwise be restarted during this process, when the controller is restarted, it will return to executing the bootloader update application, while bypassing the potentially corrupted or incomplete bootloader. The bootloader update application can then complete its operation to completely update the bootloader.

In various embodiments, before the above-described step of determining whether the controller is currently receiving power, the controller may (and the bootloader update application may be configured to) determine whether the jump code has already been stored in the initial memory block(s) of the first set of memory blocks. When it is determined that the jump code has already been stored in the initial memory block(s) of the first set of memory blocks, then the controller may (and the bootloader update application may be configured to) proceed with (e.g. continue with) the above-described process of storing data blocks of the new bootloader except the initial (first) data block(s) in memory blocks of the first set of memory blocks except the initial (first) memory block(s) (in which the jump code is stored). This determination may be made where the controller lost power or was otherwise restarted during a previous attempt at updating the bootloader.

When, on the other hand, it is determined that the jump code has not (has other than been) already stored in the initial memory block(s) of the first set of memory blocks, the controller may (and the bootloader update application may be configured to) proceed with the above-described step of determining whether the controller is currently receiving (external) power (and then storing the jump code in the initial memory block(s) of the first set of memory blocks, and so on).

Once the data blocks of the new bootloader other than the initial data block(s) have been stored in the first set of memory blocks (other than the initial memory block(s)), the controller may then (again) (and the bootloader update application may be configured to) determine whether the controller is currently receiving (external) power.

When it is determined that the controller is currently receiving (external) power, then the controller may (and the bootloader update application may be configured to) store the initial data block(s) of the new bootloader in the initial memory block(s) of the first set of memory blocks (i.e. by overwriting the jump code). When it is determined that the controller is not (is other than) receiving (external) power, then the controller may (and the bootloader update application may be configured to) not (other than) proceed with this step, e.g. by cancelling the bootloader update process or pausing the bootloader update process (in particular pausing the storing of the initial data block(s) of the new bootloader in the initial memory block(s) of the first set of memory blocks) until it is determined that power is present. This ensures that the controller has sufficient power to successfully store the initial data block(s) of the new bootloader in the initial memory block(s) of the first set of memory blocks (even if the controller loses power).

Once the initial data block(s) of the new bootloader has been stored in the initial memory block(s) of the first set of memory blocks, the bootloader update process is complete, and the bootloader update application may be disabled. It will be understood that, upon restart, the controller will now execute the new bootloader.

In various embodiments, before the above-described step of determining whether the jump code has already been stored in the initial memory block(s) of the first set of memory blocks, the controller may (and the bootloader update application may be configured to) determine whether the new bootloader has been (completely) stored in the first set of memory blocks.

When it is determined that the new bootloader has been (completely) stored in the first set of memory blocks, the controller may (and the bootloader update application may be configured to) proceed with the above-described step of disabling the bootloader update application. This determination may be made where the controller lost power during a previous attempt at updating the bootloader, e.g. before or during the disabling step. This determination may also or instead be made where an attempt is made to update the bootloader when this has already been done.

When, on the other hand, it is determined that the new bootloader has not been (has other than been) completely stored in the first set of memory blocks, the controller may (and the bootloader update application may be configured to) proceed with the above-described step of determining whether the jump code has already been stored in the initial memory block(s) of the first set of memory blocks (and so on).

All of the aspects and embodiments described herein can and in embodiments do include any one or more or all of the preferred and optional features described herein, as appropriate.

The methods described herein may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The invention also extends to a computer software carrier comprising such software which when used to operate a fire protection system or an intruder detection system comprising a data processor causes in conjunction with the data processor the system to carry out the steps of the methods described herein. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods described herein need be carried out by computer software and thus from a further broad aspect the present invention provides computer software and such software installed on a computer software carrier for carrying out at least one of the steps of the methods described herein.

The present invention may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality described herein.

Such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

BRIEF DESCRIPTION OF THE DRAWINGS

Certain preferred embodiments of the present invention will now be described, by way of example only, with reference to the following drawing, in which:

As shown in FIG. 1 the system comprises a power supply (loop driver) 11 and a set of fire protection devices 12 electrically connected in a loop configuration. Each fire protection device 12 may be, for example, a fire detector, smoke detector, heat detector, manual call point, fire alarm, fire suppression component, sprinkler, fire barrier, smoke extractor, and the like. The power supply (loop driver) 11 may be controlled by and/or may be part of another part of the fire protection system 10 such as a (fire) control panel.

DETAILED DESCRIPTION

Figure 1:
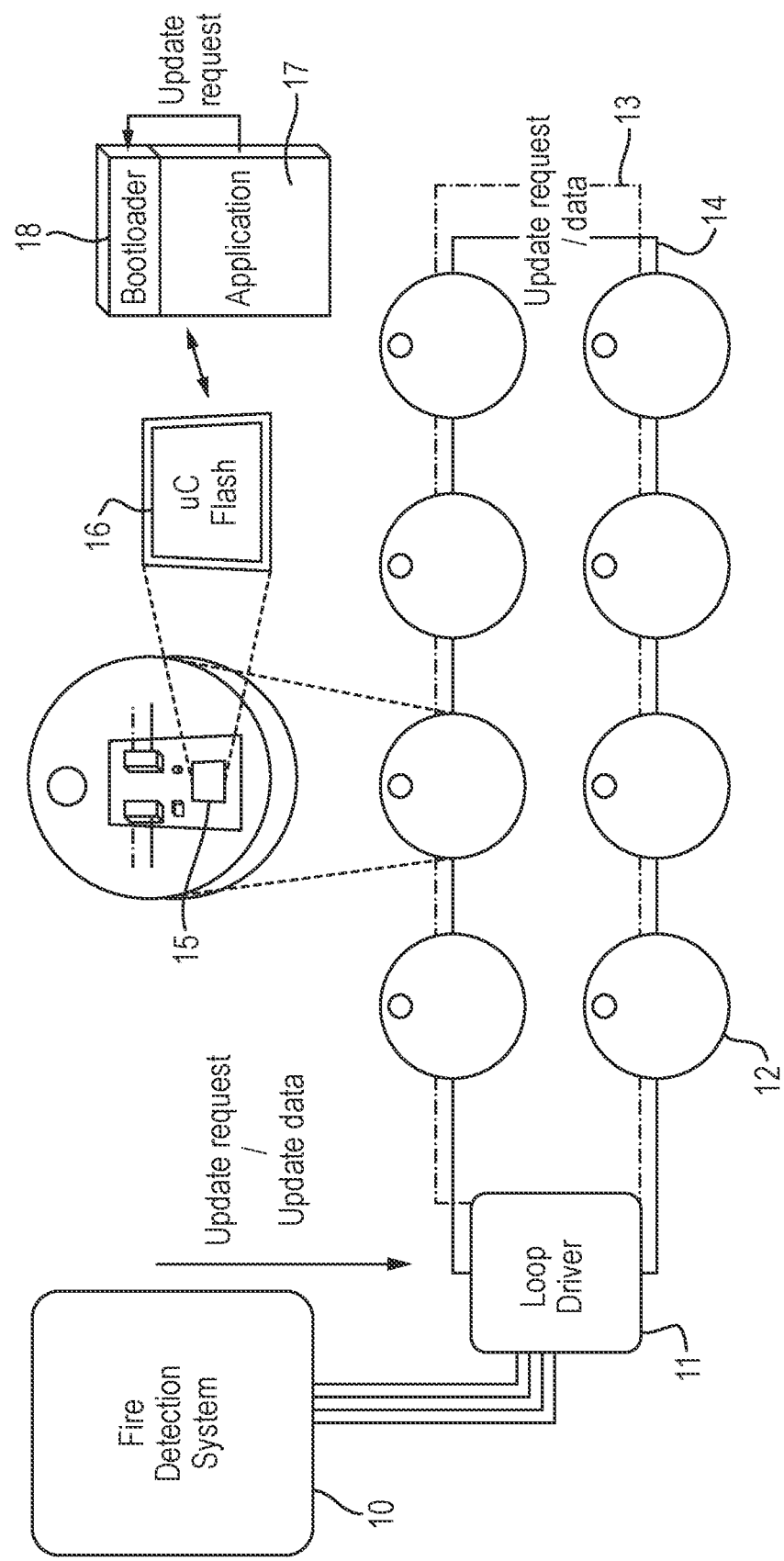
FIG. 1 shows schematically a fire protection system in accordance with various embodiments.

Although in the embodiment of FIG. 1 the system is a fire protection system, it will also be understood that the system can be any suitable system such as an intrusion detection system, and the like. Where the system is an intrusion detection system, the system may comprise an intrusion detection control panel and a plurality of intrusion detection devices connected to the intrusion detection control panel. Each intrusion detection device may be a motion sensor, contact sensor, and the like.

Each device 12 of the set of devices may be electrically connected to, and receive electrical power from, the power supply (loop driver) 11 by wiring, e.g. comprising a pair of conductors 13, 14. The conductors 13, 14 may act, for example, as a neutral conductor and a live conductor, respectively. As can be seen in FIG. 1, the wiring may be arranged in a loop configuration, i.e. such that each conductor 13, 14 starts and finishes at the power supply (loop driver) 11. Accordingly, power may be supplied at both ends of the loop wiring by the power supply (loop driver) 11.

The fire protection system is configured such that each device 12 is able to communicate with the fire control panel 10, for example via the wiring 13, 14 and the loop driver 11. In particular, as shown in FIG. 1, the control panel 10 can send update requests and data to one or more or each device 12, e.g. via the loop driver 11 and the wiring 13, 14.

As also shown in FIG. 1, one or more or each device 12 includes an embedded microcontroller 15 configured to run an application that provides the base functions of that device. The application is provided as firmware, where the application code 17 is stored in non-volatile memory 16 (e.g. self-programmable flash memory) of the microcontroller 15.

A so-called bootloader is also provided as firmware, where bootloader code 18 is also stored in the non-volatile memory 16. The bootloader is responsible for loading (starting) the application, and also provides the device 12 with the ability to update or replace the application code 17. This allows in-field application firmware updates. In embodiments, the bootloader is a single-stage bootloader, but it would also be possible for the bootloader to be the first stage of a multi-stage bootloader.

As also shown in FIG. 1, a first set of memory blocks (or "pages") of the non-volatile memory 16 stores the bootloader code 18, and the remaining memory blocks store the application code 17. The microcontroller 15 is configured such that, upon start-up (power on), the bootloader code 18 is initially executed by executing the code stored in the first set of memory blocks.

The bootloader may determine whether it is desired to update (e.g. replace) the application code 17 by checking an external signal received from the control panel 10 or elsewhere and/or by checking the status of a flag in the non-volatile memory 16. If this is not needed, the application is then started by executing appropriate application code 17 stored in the non-volatile memory 16. When, however, it is determined that it is desired to update (replace) the application code 17, the application code 17 can be updated (replaced) by writing over the existing application code 17.

Updating the application code is always possible with a working bootloader. As described above, the Applicant has recognized that, in addition to updating the application code 17, it may be necessary to update the bootloader code 18, e.g. to correct bugs in the bootloader code, or to extend its functionality.

Figure 2:
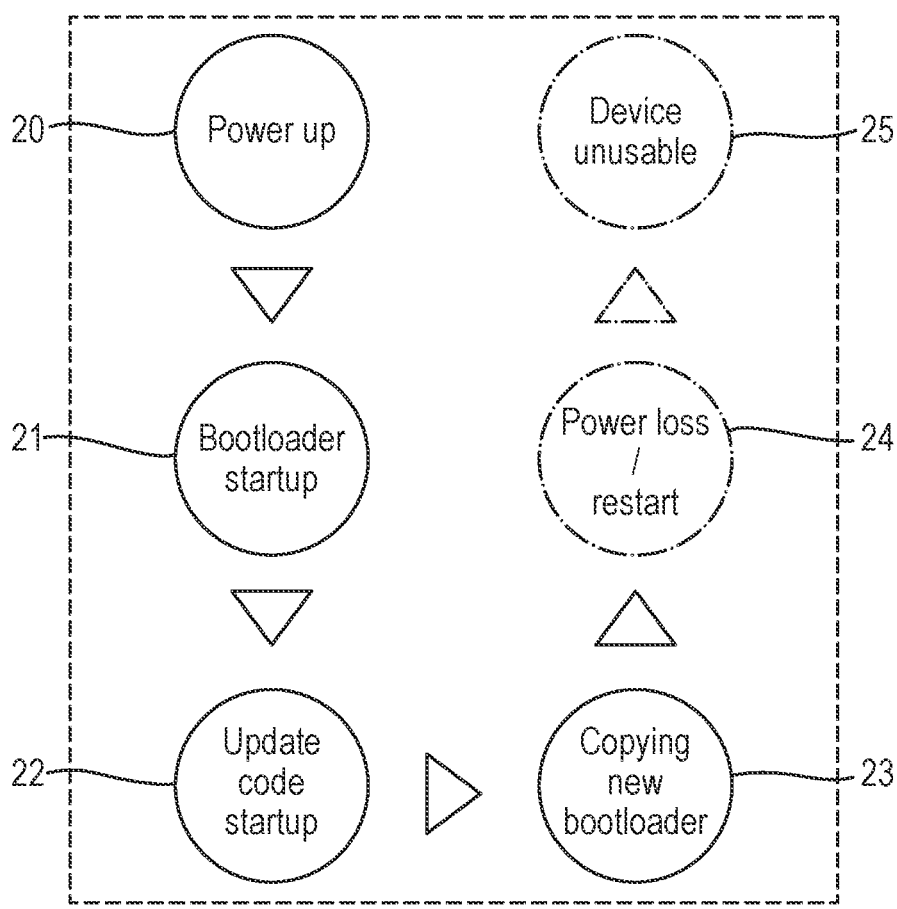
FIG. 2 is a flowchart illustrating a conventional method of updating a bootloader firmware.

However, as illustrated by FIG. 2, in conventional techniques for doing this, there can be a significant risk of the microcontroller 15 becoming inoperable (i.e. "bricked"). As shown in FIG. 2, during such a conventional process, the microcontroller 15 is powered up (step 20), the bootloader is started up (step 21), the bootloader update process is started (step 22), and then the bootloader code is updated (replaced) by writing over the existing bootloader code 18 (step 23). However, should the microcontroller 15 lose power or otherwise restart while the new bootloader code is being copied (step 24), the device can become unusable (i.e. "bricked") (step 25).

Embodiments provide a bootloader update application which is operable to update existing bootloader code 18 stored in the non-volatile memory 16 with new bootloader code. Embodiments can replace the bootloader firmware in a failsafe manner, i.e. in a manner which is resilient to failures such as a power loss or an unexpected restart.

According to various embodiments, a bootloader update application is initially provided to the microcontroller 15 and stored as an application in the non-volatile memory 16. This may be done in a failsafe manner using the conventional process of updating the application code 17. The bootloader update application code is stored in a particular (second) set of memory blocks of the non-volatile memory 16 at a particular (second) set of memory addresses for the non-volatile memory 16.

Figure 3:
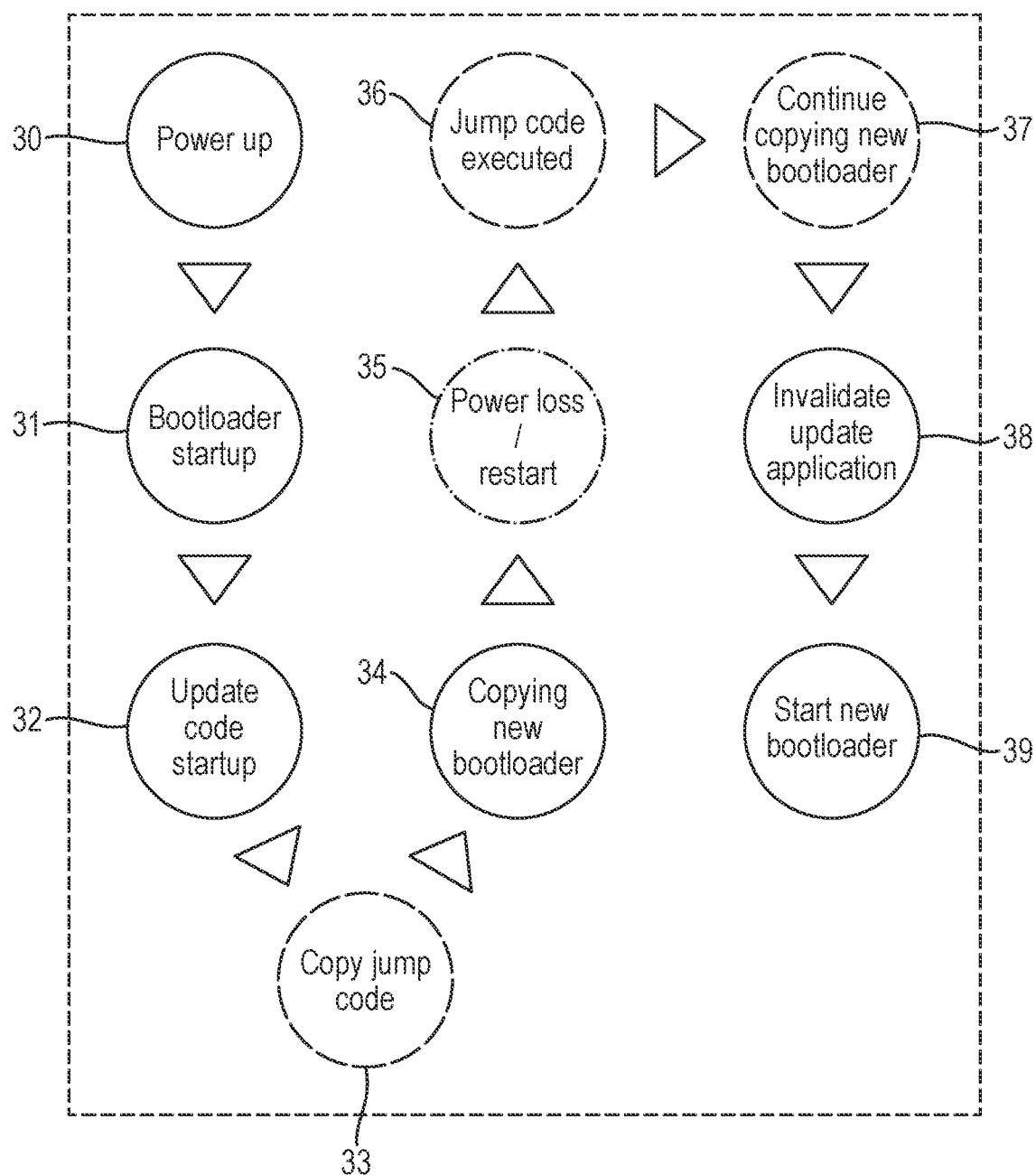
FIG. 3 is a flowchart illustrating a failsafe method of updating a bootloader firmware in accordance with various embodiments.

Once the bootloader update application has been stored in the non-volatile memory 16, the controller may then run (execute) the bootloader update application. This process is illustrated by FIG. 3. As shown in FIG. 3, in this process, the microcontroller 15 is powered up (step 30), the bootloader is started up (step 31), and the bootloader update process is started (step 32).

Next, the initial (very first) memory block of the first set of memory blocks (that is, the memory block of the non-volatile memory 16 that stores the very first data block of bootloader code 18) (e.g. the memory block with address zero) is replaced (over-written) with a jump code (step 33). This may comprise erasing the initial (very first) group (row) of memory blocks, and then writing the jump code to the initial (very first) group (row) of memory blocks. The jump code may be stored in only the initial (very first) memory block, but it would also be possible for the jump code to be stored in more than one of the initial (very first) memory blocks (i.e. in more than one of the memory blocks of the initial (very first) group (row) of memory blocks). The jump code includes a minimal startup code (i.e. as required to set the vector table and stack pointer) and an instruction to jump to the first address at which the bootloader update application code is stored in the non-volatile memory 16.

In this regard, the Applicant has recognized that if the microcontroller 15 were to loses (external) power, sufficient energy can be present internally to the microcontroller 15 (e.g. stored in one or more capacitors of the microcontroller 15) to allow at least one memory block (such as at least one group (row) of memory blocks) of the non-volatile memory 16 to be successfully programmed. This property effectively guarantees that the jump code will be successfully stored, even if the microcontroller 15 loses power. In other words, the jump code copying step (step 33) is effectively an "atomic" operation, as its duration can be much shorter than the discharging time of the microcontroller's 15 power supply circuit.

Next, the bootloader code is updated (replaced) by writing over the existing bootloader code 18 (step 34).

As shown in FIG. 3, should the microcontroller 15 lose power or otherwise be restarted while the new bootloader code is being copied (step 35), upon restart the microcontroller 15 will initially execute the jump code (step 36) thereby causing the microcontroller 15 to then execute the bootloader update application and continue copying the new bootloader code (step 37), while bypassing the potentially corrupted or incomplete bootloader code. Once this process of updating the bootloader has been successfully completed, the bootloader update application can be invalidated (step 38), and the new bootloader can be started (step 39).

It will appreciated that embodiments provide a bootloader update application which is operable to update existing bootloader code 18 stored in the non-volatile memory 16 with new bootloader code in a failsafe manner. In particular, the bootloader update process is resistant to power failures or unexpected restarts.

Figure 4:
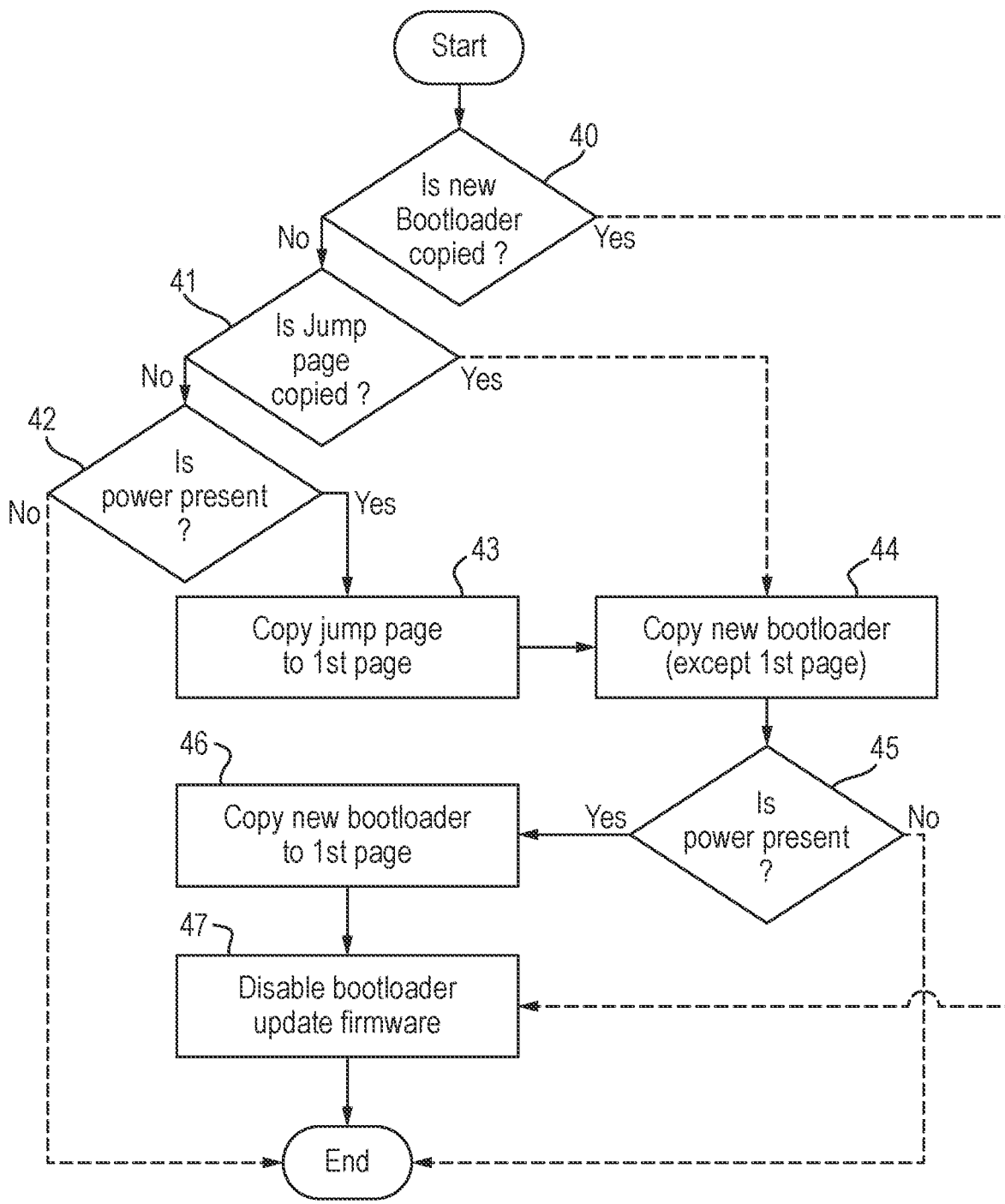
FIG. 4 is a flowchart illustrating a method in accordance with various embodiment.

FIG. 4 is a more detailed flow diagram illustrating the operation of the bootloader update application.

As shown in FIG. 4, when the bootloader update application is started, as an initial step it is determined whether the new bootloader has already been (completely) copied to the first set of memory blocks (step 40).

If it is determined that the new bootloader has been (completely) stored in the first set of memory blocks, the bootloader update application may be disabled (step 47) and the process may end. This determination will be made where the microcontroller 15 lost power during a previous attempt at updating the bootloader, e.g. before or during the disabling step (step 47). This determination can also be made where an attempt is made to update the bootloader when this has already been done.

If, on the other hand, at step 40 it is determined that the new bootloader has not been completely stored in the first set of memory blocks, a determination may then be made as to whether the jump code has already been stored in (programmed to) the initial memory block(s) of the first set of memory blocks (step 41).

If it is determined that the jump code has already been stored in the initial memory block(s) of the first set of memory blocks, then the process may proceed to storing the data blocks of the new bootloader except the initial (first) data block(s) in memory blocks of the first set of memory blocks except the initial (first) memory block(s) (in which the jump code is stored) (step 44). In other words, the microcontroller 15 may store the data blocks of the new bootloader except the initial (first) data block(s) in memory blocks of the first set of memory blocks except the initial (first) memory block(s) of the first set of memory blocks (in which the jump code is stored). This determination will be made where the controller lost power or was otherwise restarted during a previous attempt at updating the bootloader.

If, on the other hand, it is determined that the jump code has not already been stored in the initial memory block(s) of the first set of memory blocks, a check is made as to whether the microcontroller 15 is currently receiving external power (step 42).

If it is determined that the microcontroller 15 is currently receiving external power, then the microcontroller 15 can proceed with the step of storing the jump code in the initial memory block(s) of the first set of memory blocks (step 43). In other words, the microcontroller 15 firstly checks that power is present, and then replaces the first flash page of the memory 16 with a jump code to the address of the bootloader update application.

If it is determined that the microcontroller 15 is not currently receiving external power, then the microcontroller 15 may not proceed with this step, e.g. by cancelling the bootloader update process or pausing the bootloader update process (in particular pausing the writing of the jump code to the initial memory block(s) of the first set of memory blocks) until it is determined that power is present. This ensures that the microcontroller 15 has sufficient power to successfully complete the writing of the jump code.

Once the jump code has been stored in the initial memory block(s) of the first set of memory blocks, the bootloader update application can then proceed with the process of storing data blocks of the new bootloader other than the initial data block(s) in memory blocks of the first set of memory blocks other than the initial memory block(s) (step 44). It will be understood that, should the microcontroller 15 lose power during this process, when the microcontroller 15 is restarted, it will return to executing the bootloader update application, while bypassing the potentially corrupted or incomplete bootloader. The bootloader update application can then complete its operation to (completely) update or replace the bootloader.

Thus, after the jump code has been programmed, the application can safely start coping the new bootloader pages to the first set of memory pages, except for the first page.

Once the data blocks of the new bootloader other than the initial data block(s) have been stored in the first set of memory blocks, the controller may then again check whether the controller is currently receiving external power (step 45).

If it is determined that the microcontroller 15 is currently receiving external power, then the microcontroller 15 can store the initial data block(s) of the new bootloader in the initial memory block(s) of the first set of memory blocks (i.e. by overwriting the jump code) (step 46). In other words, before replacing the first flash page, the application checks that the power is present and then programs the first page with new bootloader data.

If it is determined that the microcontroller 15 is not receiving external power, then the microcontroller 15 may not proceed with this step, e.g. by cancelling the bootloader update process or pausing the bootloader update process (in particular pausing the writing of the initial data block(s) of the new bootloader in the initial memory block(s) of the first set of memory blocks) until it is determined that power is present. This ensures that the microcontroller 15 has sufficient power to successfully complete the writing of the initial data block(s) of the new bootloader to the initial memory block(s) of the first set of memory blocks.

Once the initial data block(s) of the new bootloader has been stored in the initial memory block(s) of the first set of memory blocks, the bootloader update process is complete, and the bootloader update application is disabled (step 47). Upon restart, the microcontroller 15 will execute the new bootloader (in the manner described above).

Figure 5:
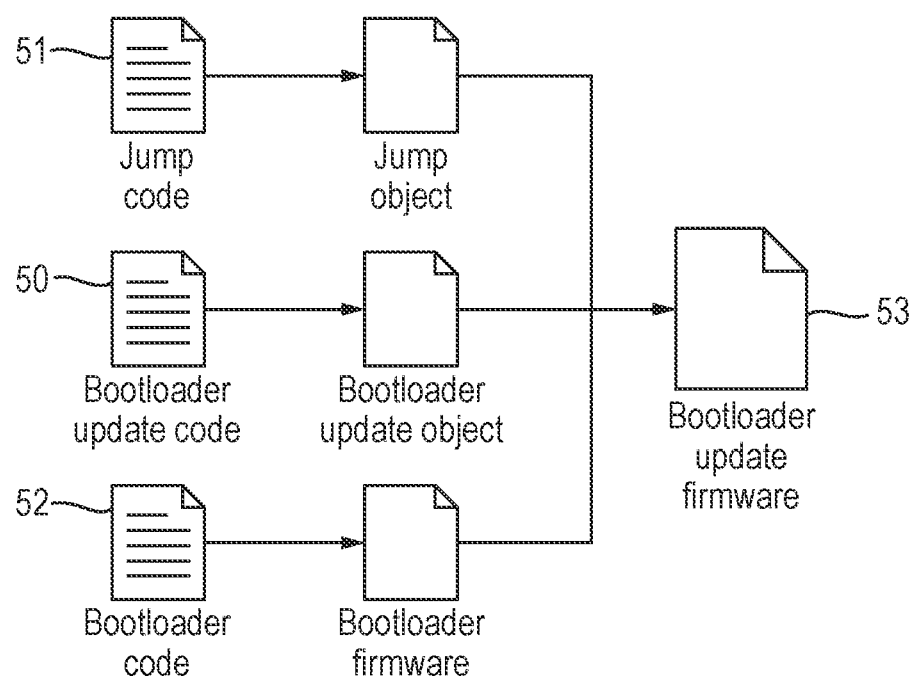
FIG. 5 shows schematically a bootloader update firmware in accordance with various embodiments.

FIG. 5 illustrates an arrangement for providing the bootloader update application in accordance with embodiments. As shown in FIG. 5, the bootloader update application code 50 may be provided together with the jump code 51 and also the new bootloader code 52. The bootloader update code 50 is a code that executes a logic of the bootloader update application described above. The jump code 51 can be the (e.g. minimum) code that needs to be executed (on particular device) to execute a jump (branch) to the bootloader update application code.

These three may be combined to create a bootloader update firmware 53 that is stored in the (second set of memory blocks of the) non-volatile memory 16 (in the manner described above). As shown in FIG. 5, the bootloader update firmware 53 can be created by linking compiled update bootloader code with jump code and new bootloader firmware binaries. The jump object and bootloader firmware binaries can be placed at the predefined addresses by the linker.

Various other embodiments are, however, possible. For example, the bootloader code 52 need not be provided as part of the bootloader update firmware 53 that is stored in the non-volatile memory 16. The bootloader update firmware 53 can instead include an instruction or instructions to download the new bootloader code 52 e.g. from the control panel and/or via a network connection, etc.

FIG. 6 illustrates schematically the status of the non-volatile memory 16 during the various steps of the bootloader update process described above. As shown in FIG. 6A, the non-volatile memory 16 initially stores the old bootloader code 18 and the application firmware code 17. As shown in FIG. 6B, the application 17 is then overwritten by the bootloader update firmware 53, which in this embodiment includes the bootloader update logic, the jump code and the new bootloader.

Figure 6E:
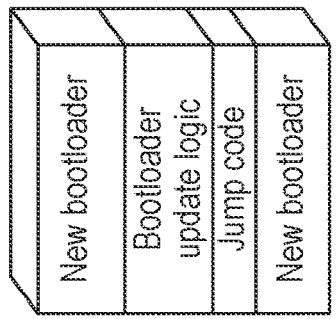
FIGS. 6A-6E show schematically various states of a non-volatile memory during a bootloader update process in accordance with various embodiments.
Figure 6D:
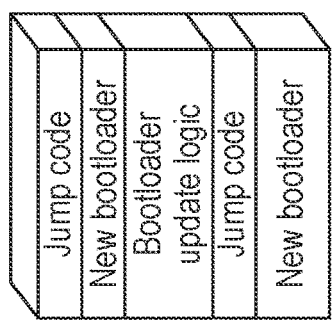
Figure 6C:
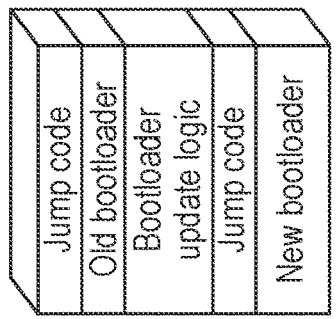
Figure 6B:
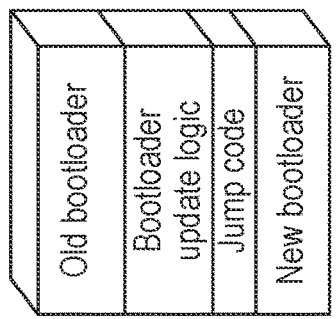
Figure 6A:
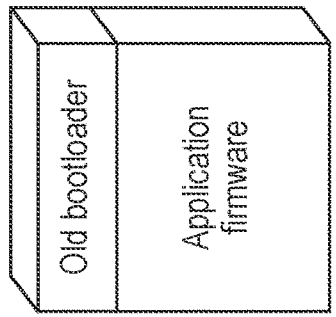

As shown in FIG. 6C, the jump code is copied to the first memory address of the non-volatile memory 16. Next, as shown in FIG. 6D, the old bootloader code 18 is updated with the new bootloader code (except for the first block(s)). Finally, as shown in FIG. 6E, the jump code is overwritten with the first block(s) of the new bootloader code. Upon restart, the microcontroller 15 will now execute the new bootloader, as desired.

As described above, embodiments rely on the power supply circuit of the microcontroller 15 providing sufficient energy to allow safe programming of at least one (or more than one) flash page after the microcontroller 15 is disconnected from the power source. Based on this property, the update logic initially replaces the first page of the old bootloader with a jump code to the address of update firmware code, which ensures that the bootloader update process will be continued even after an unexpected interruption (e.g. power loss).

Thus, to provide a failsafe update process which is resistant to power loss, the device should be configured such that its power supply provides enough energy for safe programming of at least a single flash page after external power loss.

Figure 7:
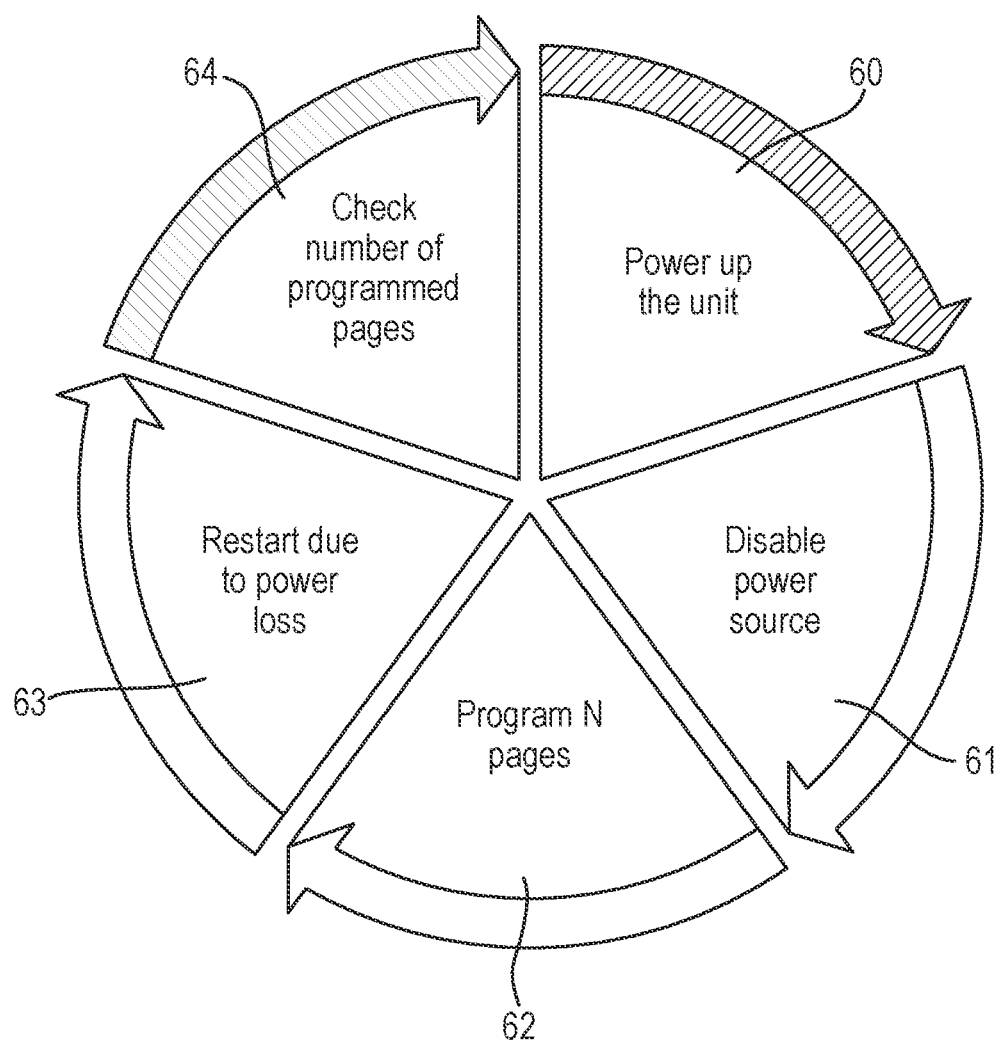
FIG. 7 shows schematically a method of determining a number of pages that are programmable by a microcontroller after a power loss.

FIG. 7 illustrates a process for determining the number of memory blocks of the non-volatile memory 16 that can be programmed when the microcontroller 15 is not receiving external power. The presented algorithm measures the duration of the power off time and the number of programmed pages during that time. As shown in FIG. 7, in this process, the microcontroller 15 is initially powered up (step 60) and the power is then disabled (step 61), and the microcontroller 15 is caused to program a number of pages (step 62). When eventually the microcontroller 15 is restarted due to power loss (step 63), the number of successfully programmed pages can be determined (step 64).

If the number of programmed pages during the power off period is greater than some minimum desired threshold (e.g. >8), the bootloader update algorithm can be safely applied in the field. If, however, the number of programmed pages is smaller than the desired threshold, the capacitance on the printed circuit board can be increased to satisfy the above condition.

It will be appreciated that various embodiments provide a bootloader update firmware that is resistant to power failures during a bootloader update process.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A system comprising:
a controller comprising a non-volatile memory that stores firmware for the controller, wherein the non-volatile memory comprises a first set of memory blocks that store a bootloader for the controller, wherein the non-volatile memory is configured such that each memory block of the first set of memory blocks can be erased individually;
wherein the system is configured to update the firmware by:
storing a bootloader update application in a second set of memory blocks of the non-volatile memory; and
replacing an initial memory block of the first set of memory blocks with a jump code such that the bootloader stored in the first set of memory blocks is partially erased, wherein the jump code comprises an instruction to jump to an initial memory block of the second set of memory blocks;
wherein the system is configured to provide energy internally to the controller when the controller loses external power so that at least one memory block of the non-volatile memory can be erased and written to without the controller receiving external power in order to guarantee that the jump code will be successfully stored.

2. The system of claim 1, wherein the system is configured to determine whether the controller is receiving external power before storing the jump code in the initial memory block of the first set of memory blocks.

3. The system of claim 1, wherein the system is configured to store a new bootloader for the controller in the non-volatile memory by:
storing data blocks of the new bootloader other than one or more initial data blocks of the new bootloader in memory blocks of the first set of memory blocks other than the one or more initial memory blocks;
determining whether the controller is receiving external power; and then
storing the one or more initial data blocks of the new bootloader in the one or more initial memory blocks of the first set of memory blocks.

4. The system of claim 1, wherein the system is a fire protection system or an intrusion detection system.

5. A method of updating firmware stored in a non-volatile memory of a controller, wherein the non-volatile memory comprises a first set of memory blocks that store a bootloader for the controller, the method comprising:
storing a bootloader update application in a second set of memory blocks of the non-volatile memory, wherein the non-volatile memory is configured such that each memory block of the first set of memory blocks can be erased individually; and
replacing an initial memory block of the first set of memory blocks with a jump code such that the bootloader stored in the first set of memory blocks is partially erased, wherein the jump code comprises an instruction to jump to an initial memory block of the second set of memory blocks; and
wherein, when the controller loses external power, energy is provided internally to the controller so that at least one memory block of the non-volatile memory can be erased and written to without the controller receiving external power in order to guarantee that the jump code will be successfully stored.

6. The method of claim 5, further comprising determining whether the controller is receiving external power before storing the jump code in the initial memory block of the first set of memory blocks and when it is determined that the controller is receiving external power, storing the jump code in the initial memory block of the first set of memory blocks.

7. The method of claim 5, further comprising determining whether the jump code has already been stored in the initial memory block of the first set of memory blocks before storing the jump code in the initial memory block of the first set of memory blocks and/or before determining whether the controller is receiving external power.

8. The method of claim 5, further comprising determining whether a new bootloader has been stored in the first set of memory blocks before storing the jump code in the initial memory block of the first set of memory blocks and/or before determining whether the controller is receiving external power and/or before determining whether the jump code has already been stored in the initial memory block of the first set of memory blocks.

9. The method of claim 5, further comprising storing a new bootloader for the controller in the non-volatile memory by storing data blocks of the new bootloader other than one or more initial data blocks of the new bootloader in memory blocks of the first set of memory blocks other than the one or more initial memory blocks.

10. The method of claim 9, further comprising determining whether the controller is receiving external power before storing the one or more initial data blocks of the new bootloader in the one or more initial memory blocks of the first set of memory blocks.

11. A method of updating firmware stored in a non-volatile memory of an embedded controller of a fire protection device or an intrusion detection device, the method comprising updating the firmware of the embedded controller using the method of claim 5.

12. The method of claim 5, wherein only a portion of the bootloader is erased, the portion being less than the entire bootloader.

* * * * *